(12) United States Patent
Atsuchi et al.

(10) Patent No.: US 10,724,437 B2
(45) Date of Patent: Jul. 28, 2020

(54) SYSTEMS AND METHODS FOR PARTICLE SEPARATOR IN A GAS TURBINE ENGINE

(71) Applicant: General Electric Company, Schenectady, NY (US)

(72) Inventors: Satoshi Atsuchi, Rexford, NY (US); Byron Andrew Pritchard, Jr., Cincinnati, OH (US); Corey Bourassa, Mechanicville, NY (US); Erich Alois Krammer, West Chester, OH (US)

(73) Assignee: General Electric Company, Schenectady, NY (US)

( * ) Notice: Subject to any disclaimer, the term of this patent is extended or adjusted under 35 U.S.C. 154(b) by 390 days.

(21) Appl. No.: 15/635,519

(22) Filed: Jun. 28, 2017

(65) Prior Publication Data

US 2019/0003388 A1 Jan. 3, 2019

(51) Int. Cl.
*F02C 7/052* (2006.01)
*B01D 45/16* (2006.01)
*B01D 45/06* (2006.01)
*B07B 7/086* (2006.01)
(Continued)

(52) U.S. Cl.
CPC .............. *F02C 7/052* (2013.01); *B01D 45/06* (2013.01); *B01D 45/16* (2013.01); *B07B 7/086* (2013.01); *B64D 2033/0246* (2013.01); *F02C 7/12* (2013.01); *F05D 2260/607* (2013.01)

(58) Field of Classification Search
CPC ... F02C 7/05; F02C 7/052; F02C 7/30; B64D 2033/0246; F04D 29/70; F05B 2260/63; F05B 2260/607; B01D 45/16; B01D 45/04; B01D 45/12; B01D 2259/4575; B07B 7/086; F01D 25/32; F05D 2260/95; F05D 2260/607
See application file for complete search history.

(56) References Cited

U.S. PATENT DOCUMENTS 3,832,086 A 8/1974 Hull, Jr. et al.
3,970,439 A 7/1976 Murphy
(Continued)

FOREIGN PATENT DOCUMENTS

CA 2949547 A1 * 2/2016 ............... F02C 7/05
WO 2016195602 A1 12/2016

OTHER PUBLICATIONS

Bruce Miller, "Fossil Fuel Emissions Control Technologies: Chapter 3—Particulate formation and control technologies", section 3.1, Elsevier, available online May 22, 2015, retrieved from ScienceDirect on Nov. 7, 2019 (Year: 2015).*
(Continued)

*Primary Examiner* — Gerald L Sung
*Assistant Examiner* — Stephanie Cheng
(74) *Attorney, Agent, or Firm* — Armstrong Teasdale LLP

(57) ABSTRACT

A particle separator system for use with a turbomachine is provided. The particle separator system includes a first end, a second end opposite the first end, a main separator body extending between the first and second ends, the main separator body including at least one step configured to cause a fluid flow to turn up to 180 degrees, and at least one transversely oriented cyclone separator disposed within the main separator body and defining at least one of a swirling cylinder, a bent cylinder, and a conical volume.

16 Claims, 8 Drawing Sheets

(51) Int. Cl.
*F02C 7/12* (2006.01)
*B64D 33/02* (2006.01)

(56) References Cited

U.S. PATENT DOCUMENTS

| | | | |
|---|---|---|---|
| 4,001,121 A * | 1/1977 | Bielefeldt | B01D 45/14 |
| | | | 210/512.3 |
| 4,289,611 A | 9/1981 | Brockmann | |
| 4,375,365 A | 3/1983 | Muller et al. | |
| 4,685,942 A | 8/1987 | Klassen et al. | |
| 4,820,427 A | 4/1989 | Ryynanen | |
| 7,175,771 B2 | 2/2007 | Bridges | |
| 7,931,740 B2 * | 4/2011 | Al-Alusi | B01D 45/16 |
| | | | 55/337 |
| 7,998,250 B2 | 8/2011 | Pondelick et al. | |
| 9,314,723 B2 | 4/2016 | Judd et al. | |
| 2018/0291809 A1 * | 10/2018 | Seo | B01D 45/16 |

OTHER PUBLICATIONS

Global Pumps, "What are the differences between pump types?", Jul. 22, 2016, retrieved from https://www.globalpumps.com.au/blog/what-are-the-differences-between-pump-types on Nov. 7, 2019 (Year: 2016).*

* cited by examiner

SYSTEMS AND METHODS FOR PARTICLE SEPARATOR IN A GAS TURBINE ENGINE

BACKGROUND

The field of the disclosure relates generally to gas turbine engines and, more particularly, to particle separators for turbomachines and method of enhancing particle removal in a turbomachine.

At least some known turbomachines, i.e., gas turbine engines, compress air via a plurality of rotatable compressor blades and ignite a fuel-air mixture in a combustor to generate combustion gases that are channeled through rotatable turbine blades via a hot gas path. Such known turbomachines convert thermal energy of the combustion gas stream to mechanical energy used to generate thrust and/or rotate a turbine shaft to power an aircraft. Output of the turbomachine may also be used to power a machine, for example, an electric generator, a compressor, or a pump.

Many of these known turbomachines include internal cooling air circuits for high temperature components. Air is drawn into the turbomachine during operation, channeled through the compressor, and into the cooling air circuits, thereby cooling selected components. Turbomachines frequently encounter conditions in which a high level of sand and/or particulate matter exists, such as in deserts and air-polluted regions. When sand and/or other particles enter the cooling air circuits, the particles accumulate. This accumulation of particles decreases the effectiveness of cooling the high temperature components, as cooling air is prevented from directly contacting surfaces of the high temperature components. Additionally, alteration of high temperature component geometry and/or reduction in cooling flow by the particles also decreases the effectiveness of cooling the high temperature components. As a result, the anticipated service life of turbine components may be shortened, thereby resulting in unplanned engine downtime and increased maintenance costs.

BRIEF DESCRIPTION

In one aspect, a particle separator system for use with a turbomachine is provided. The particle separator system includes a first end, a second end opposite the first end, a main separator body extending between the first and second ends, the main separator body including at least one step configured to cause a fluid flow to turn up to 180 degrees, and at least one transversely oriented cyclone separator disposed within the main separator body and defining at least one of a swirling cylinder, a bent cylinder, and a conical volume.

In a further aspect, a turbomachine is provided. The turbomachine includes a compressor, a turbine rotatably coupled to the compressor, a combustor coupled in flow communication with the compressor and the turbine, a cooling system including a first wall and a second wall at least partially defining at least one primary fluid passage, the first wall further defining at least one auxiliary fluid passage, and a particle separator system. The particle separator system includes a first end, a second end opposite the first end, a main separator body extending between the first and second ends, the main separator body including at least one step configured to cause a fluid flow to turn up to 180 degrees, and at least one transversely oriented cyclone separator disposed within the main separator body and defining at least one of a swirling cylinder, a bent cylinder, and a conical volume.

In another aspect, a method of enhancing particle removal from a fluid flow in a turbomachine is provided. The method includes establishing a primary fluid flow through the at least one primary fluid passage of the turbomachine, diverting at least portion of the primary fluid flow through at least one particle separator system that includes at least one step configured to cause at least a portion of the primary fluid flow to turn up to 180 degrees and at least one transversely oriented cyclone separator, separating, using the particle separator system, the primary fluid flow into a particle-laden main fluid flow and a substantially particle-free auxiliary fluid flow, and diverting the auxiliary fluid flow through at least one existing or added auxiliary fluid passage.

DRAWINGS

These and other features, aspects, and advantages of the present disclosure will become better understood when the following detailed description is read with reference to the accompanying drawings in which like characters represent like parts throughout the drawings, wherein.

Figure 1:
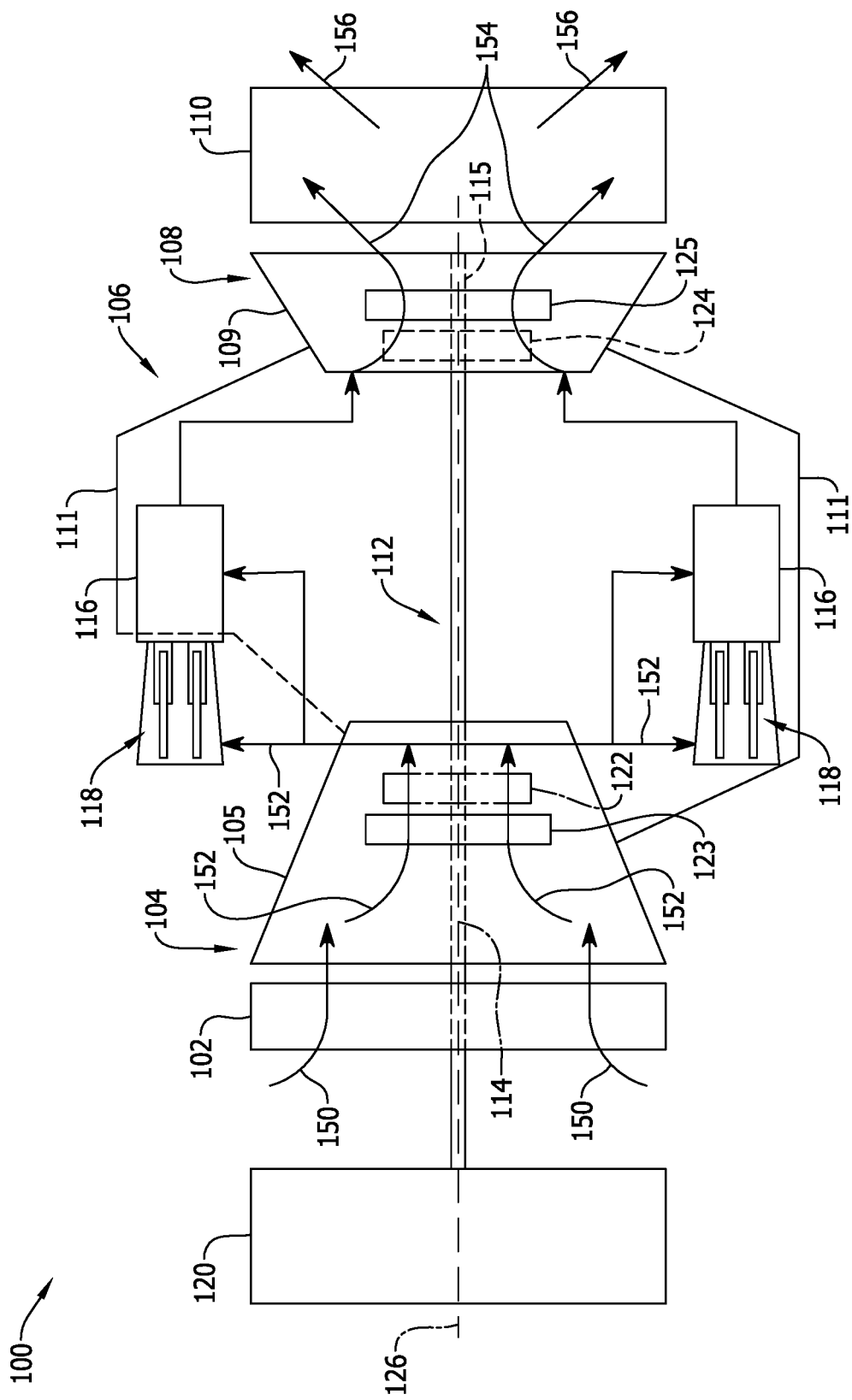
FIG. 1 is a schematic diagram of an exemplary turbine engine.
Figure 2:
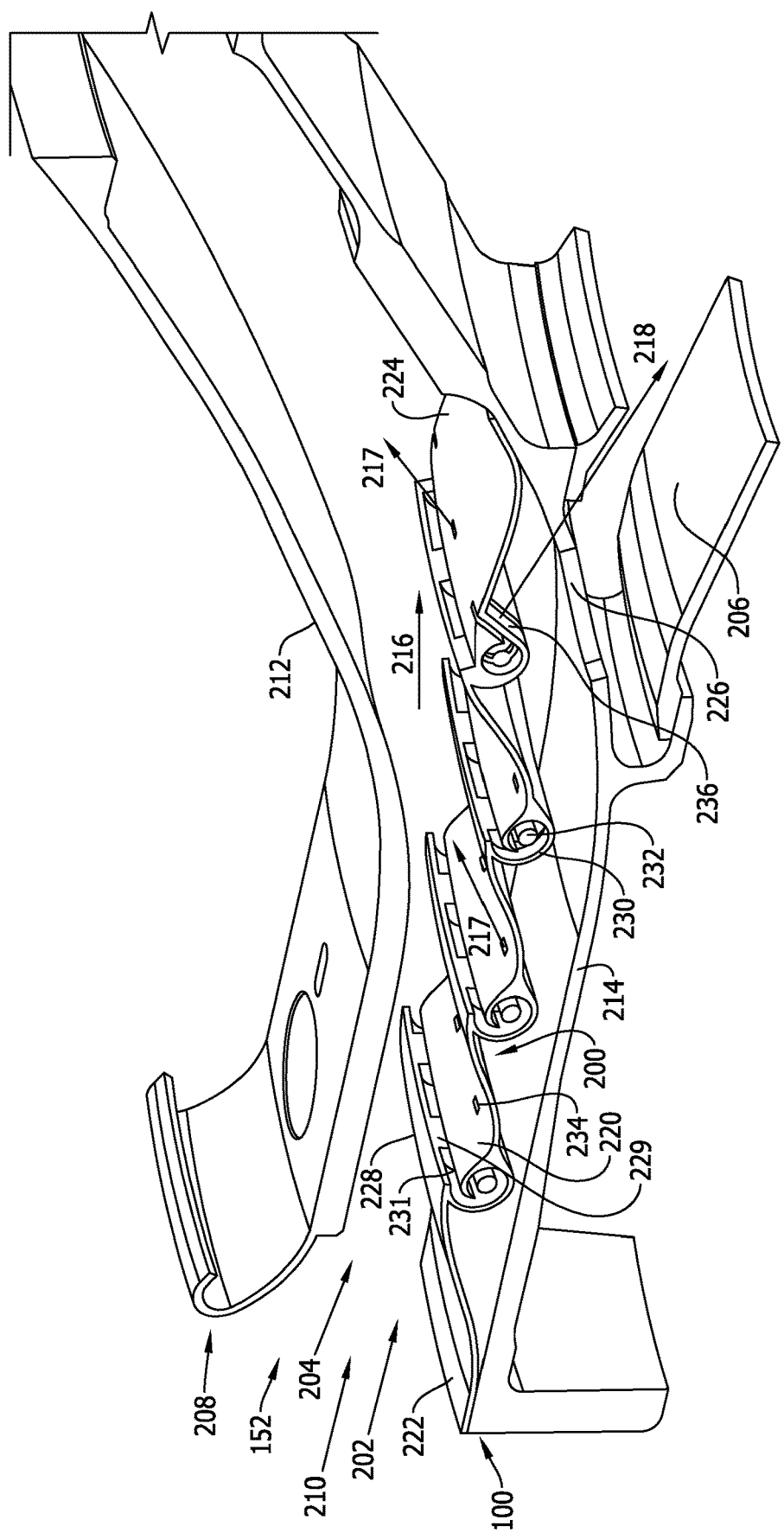
FIG. 2 is a perspective cut-away view of an exemplary cooling system that may be used with the turbine engine shown in FIG. 1.
Figure 5A:
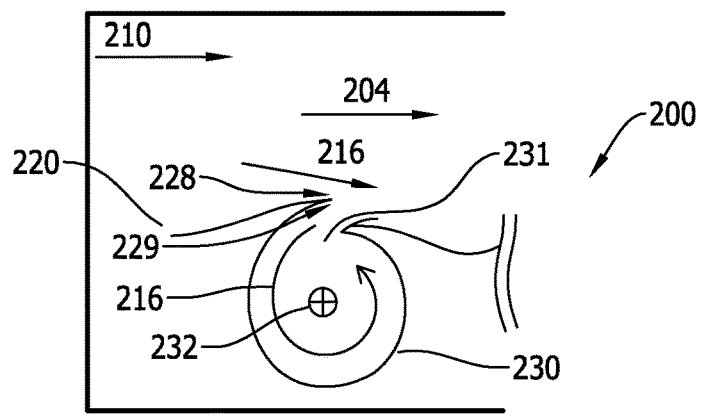
Figure 5B:
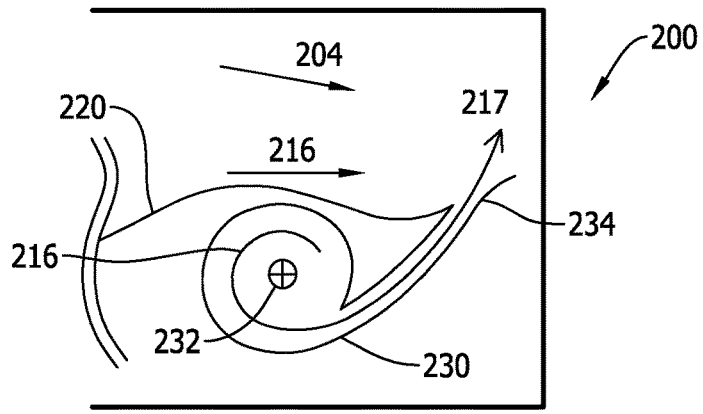
Figure 5C:
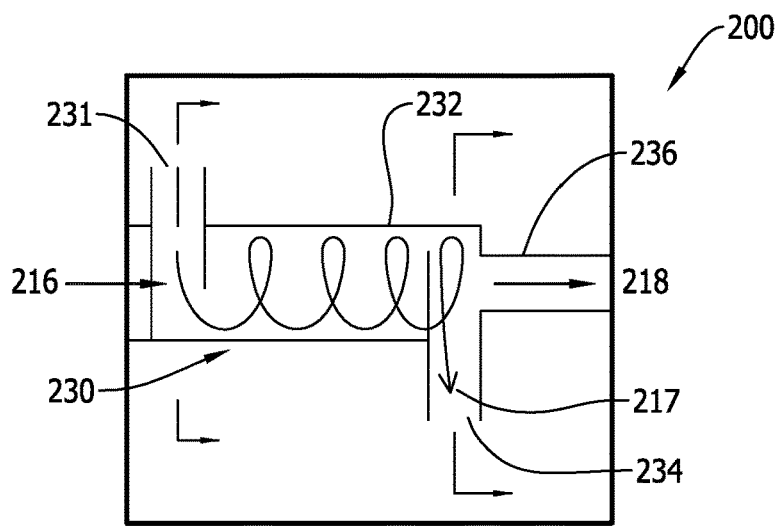
Figure 6:
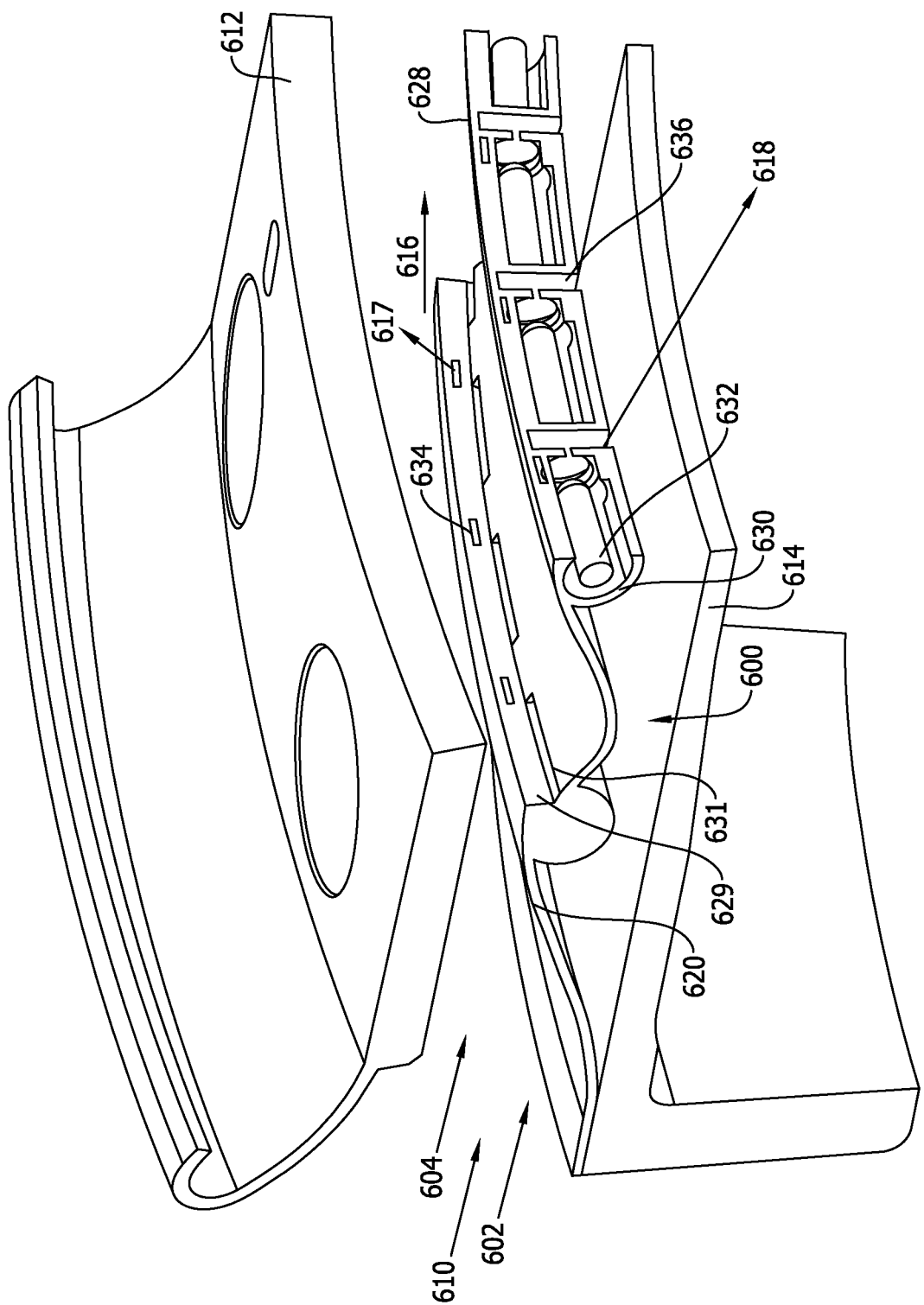
Figure 7A:
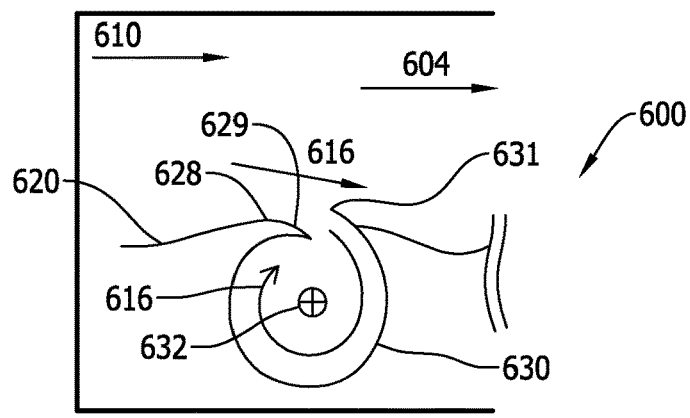
Figure 7B:
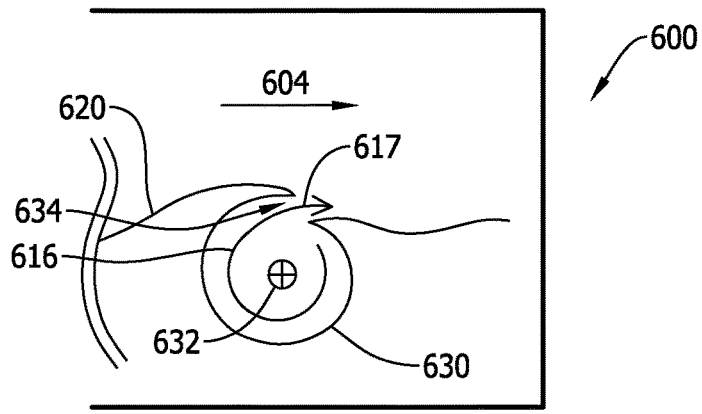
Figure 7C:
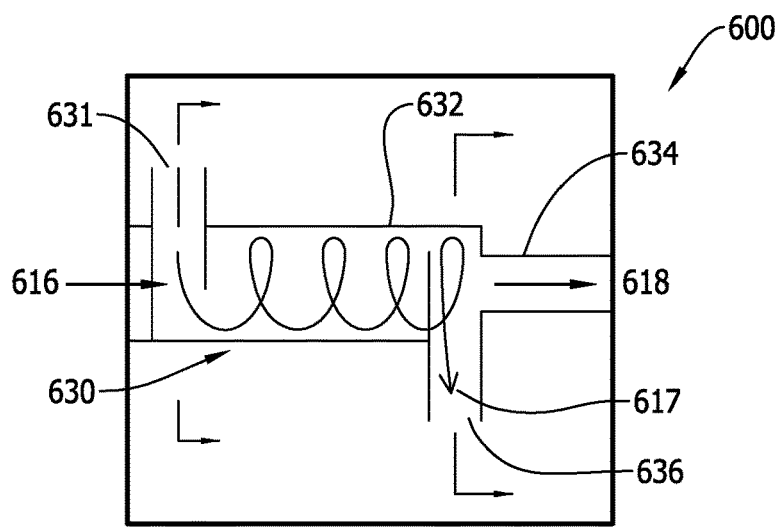
Figure 8:
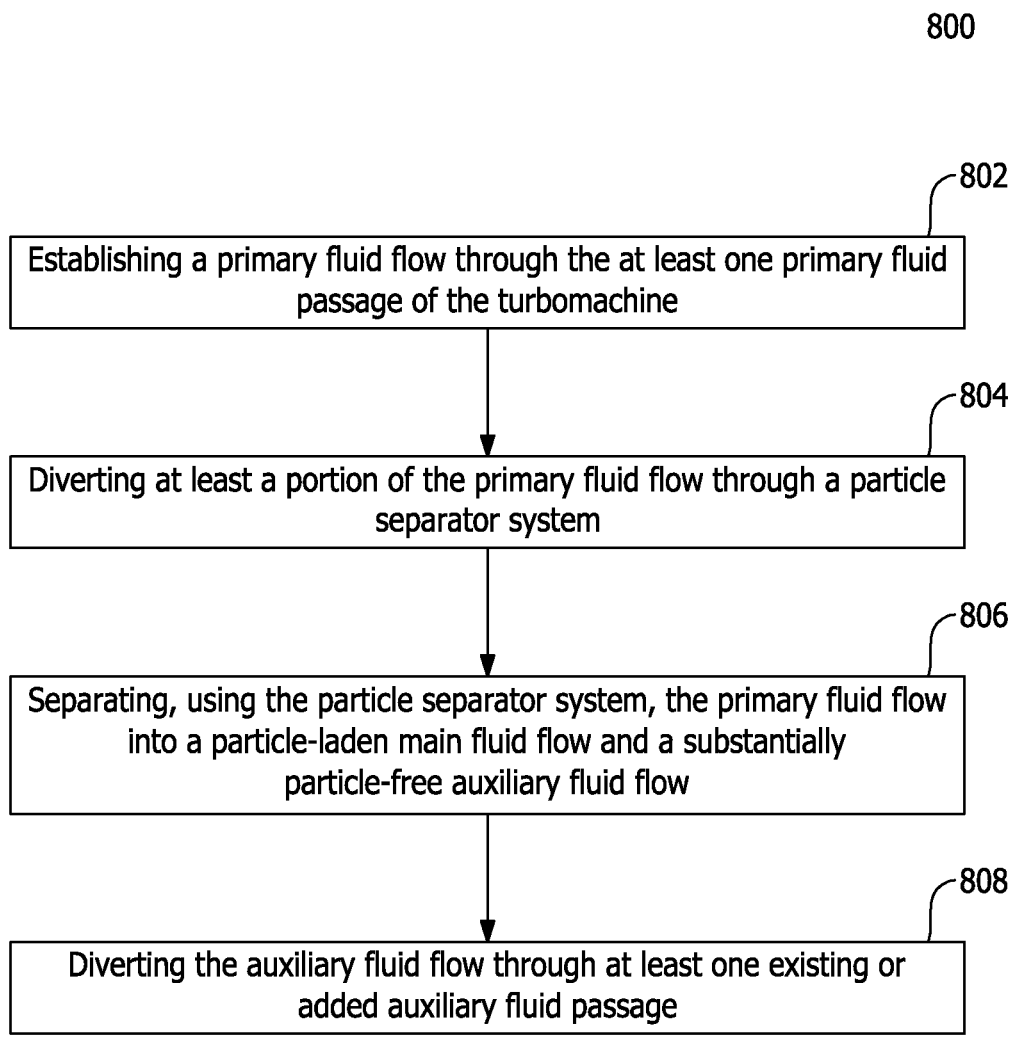

FIGS. 5A, 5B, and 5C are schematic diagrams of air flow through the particle separator system shown in FIG. 2;

FIG. 6 is a perspective cut-away view of an alternative cooling system that may be used with the turbine engine shown in FIG. 1;

FIGS. 7A, 7B, and 7C are schematic diagrams of air flow through the particle separator system shown in FIG. 6; and FIG. 8 is a flow diagram for an exemplary method of enhancing particle removal from a fluid flow in the turbine engine shown in FIG. 1.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The particle separating devices described herein provide a cost-effective method for reducing sand particles and/or particulate matter within cooling systems of turbomachines. Specifically, in order to reduce particles within the cooling system, the particle separators described herein utilize a difference in inertia between particles and air molecules as a separation mechanism. The particle separator is located over a cooling air extraction hole serving as a particle shield such that particles are restricted from directly entering the cooling passage. Optionally, the particle separator modifies a cross-sectional area of a flow passage, accelerating particle-laden flow therein. Cooling air is routed over a step within the particle separator, and into a cyclone separator. The particle-laden flow turns up to 180° at the step, and is routed through the cyclone separator such that particles with higher inertia are separated and carried downstream. Specifically, the step facilitates removing larger particles from a flow traveling into the cooling passage, and the cyclone separator facilitates removing smaller particles from the flow traveling into the cooling passage. As such, the amount of particles traveling into the cooling passage is substantially decreased. The particle separators described herein offer advantages that include, without limitation, cost effective implementation and retrofit application. Moreover, use of the particle separators describe herein maintains the effectiveness of cooling systems within turbomachines by reducing particle accumulation in turbine components, which extends engine component service life.

As used herein, the terms "axial" and "axially" refer to directions and orientations which extend substantially parallel to a centerline 126, as shown in FIG. 1, of a turbine engine. Moreover, the terms "radial" and "radially" refer to directions and orientations which extend substantially perpendicular to the centerline of the turbine engine. In addition, as used herein, the terms "circumferential" and "circumferentially" refer to directions and orientations which extend arcuately about the centerline of the turbine engine. The term "fluid," as used herein, includes any medium or material that flows, including, but not limited to air.

FIG. 1 is a schematic view of a rotary machine 100, i.e., a turbomachine, and more specifically, a turbine engine. In the exemplary embodiment, turbine engine 100 is an aircraft engine. Alternatively, turbine engine 100 is any other turbine engine and/or rotary machine, including, without limitation, a gas turbine engine. In the exemplary embodiment, turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine engine 100 is enclosed within a turbine casing 109 and includes an exhaust section 110 that is downstream from turbine section 108. A combustor housing 111 extends about combustor section 106 and is coupled to compressor casing 105 and turbine casing 109. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a fan assembly 120 via drive shaft 114. Alternatively, aircraft engine 100 may be a gas turbine engine and for example, and without limitation, be rotatably coupled to an electrical generator and/or a mechanical drive application, e.g., a pump. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., blade 125 and at least one adjacent stationary nozzle assembly 124. Each compressor blade assembly 122 and each turbine blade 125 is coupled to rotor assembly 112, or, more specifically, compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. After impinging turbine blade 125, thermal energy is converted to mechanical rotational energy that is used to drive rotor assembly 112. Turbine section 108 drives compressor section 104 and/or fan assembly 120 via drive shafts 114 and 115, and exhaust gases 156 are discharged through exhaust section 110 to ambient atmosphere.

FIG. 2 is a perspective cut-away view of an exemplary cooling system 202 that may be used with turbine engine 100. Similar to the description above, turbine engine 100 includes a cooling system 202 that channels cooling air from compressor section 104 towards an air cooled component such as blade 125 (shown in FIG. 1). Cooling system 202 includes at least one primary fluid passage 204, such as a combustor bypass passage, coupled in flow communication with at least one auxiliary fluid passage 206, such as a cooling air passage. Compressed air 152 discharged from compressor section 104 (shown in FIG. 1) is split into a combustion flow 208 channeled towards combustor section 106 (shown in FIG. 1) and a combustor bypass flow 210 channeled around combustor section 106 (shown in FIG. 1) within primary fluid passage 204.

Combustor bypass flow 210 includes a primary fluid flow 216, a main fluid flow 217 through primary fluid passage 204, and an auxiliary fluid flow 218 through auxiliary fluid passage 206. Primary fluid passage 204 is defined by a second wall 212 and a first wall 214. First wall 214 further defines auxiliary fluid passage 206. Auxiliary fluid flow 218 flows through auxiliary fluid passage 206 towards the air cooled component. Main fluid flow 217 and auxiliary fluid flow 218 are generated from primary fluid flow 216, as described herein.

In the exemplary embodiment, cooling system 202 further includes a particle separator system 200. Particle separator system 200 includes a main separator body 220. Main separator body 220 has a first end 222 and a second end 224 opposite first end 222. First end 222 of main separator body 220 is coupled to first wall 214. Second end 224 of main separator body 220 optionally extends radially from first wall 214 into primary fluid passage 204 and extends axially from first end 222 of main separator body 220 in a direction defined by primary fluid flow 216 through primary fluid passage 204. Main separator body 220 includes at least one step 228, and step 228 includes a face 229. In the exemplary embodiment, step 228 is a backward facing step (i.e., step 228 is oriented such that air flows over step 228 and flows backward into particle separator system 200 proximate to face 229). Step 228 may have a step height, for example, between and including approximately 0.01 inches and 0.25 inches. Alternatively, Step 228 may have any dimensions that enable particular separator system 200 to function as described herein. Additionally, face 229 is oriented substantially perpendicular to the direction of primary fluid flow 216. In the exemplary embodiment, main separator body 220 includes at least one inlet 231 formed on or within face 229. In alternative embodiments, at least one inlet 231 may be positioned adjacent to face 229. Additionally, in the exemplary embodiment, main separator body 220 includes at least one main outlet 234 and at least one auxiliary outlet 236. Additionally, main separator body 220 defines at least one transversely oriented cyclone separator 230. Cyclone separator 230 is coupled to step 228, and is in flow communication with inlet 231. Inlet 231 diverts primary fluid flow 216 from primary fluid passage 204 into cyclone separator 230 after the fluid has passed over step 228.

Furthermore, in the exemplary embodiment, cyclone separator 230 extends transversely in a direction perpendicular to primary fluid flow 216 through primary fluid passage 204. Optionally, particle separator system 200 is disposed within primary fluid passage 204 at a radial distance from first wall 214 within a range from greater than or equal to 20 percent of a primary fluid passage radial height to less than or equal to 90 percent of the primary fluid passage radial height. Cyclone separator 230 defines a swirling cylinder 232. In alternative embodiments, cyclone separator 230 defines a bent cylinder, conical volume, or some combination thereof. In the exemplary embodiment, swirling cylinder 232 is a reverse swirling cylinder. In a reverse swirling cylinder, fluid flow centrifugally turns in a direction opposite to the direction of primary fluid flow 216. In alternative embodiments, swirling cylinder 232 may be a forward swirling cylinder. In a forward swirling cylinder, fluid flow centrifugally turns in the direction of primary fluid flow 216. Additionally, the swirling cylinder 232 may include an open geometry. Alternatively, swirling cylinder 232 may include a centerbody. Additionally, the passage within swirling cylinder 232 may include a spiraling thread type passage that extends the length of the cylinders.

Primary fluid flow 216 enters cyclone separator 230, and is separated into a particle-laden main fluid flow 217 and a substantially particle-free auxiliary fluid flow 218. In the exemplary embodiment, main outlet 234 is in flow communication with primary fluid passage 204, and is configured to direct main fluid flow 217 out of cyclone separator 230, and back into primary fluid passage 204 after primary fluid flow 216 has entered cyclone separator 230 and traveled through swirling cylinder 232. Main fluid flow 217 consists of primary fluid that has been swirled by a swirling cylinder, such as swirling cylinder 232, and that contains particles (e.g., larger than approximately 1 micron). Additionally, auxiliary outlet 236 is in flow communication with auxiliary fluid passage 206, and is configured to direct auxiliary fluid flow 218 out of cyclone separator 230 towards cooling inlet hole 226 and auxiliary fluid passage 206. At least a portion of auxiliary fluid flow 218 passes through cooling inlet hole 226 and enters auxiliary fluid passage 206.

Cyclone separator 230 is coupled to at least one of first wall 214, second wall 212, and main separator body 220. In the exemplary embodiment, main separator body 220 has a curvature that is substantially similar to the curvature of second wall 212. In alternative embodiments, cyclone separator 230 may have any other shape that allows particle separator system 200 to operate as described herein.

In the exemplary embodiment, main separator body 220 and step 228 are integrally formed. In some alternative embodiments, main separator body 220, step 228, and cyclone separator 230 are integrally formed. In some other alternative embodiments, main separator body 220, step 228, and cyclone separator 230 are separate members that are coupled together. Particle separator system 200 spans substantially circumferentially across primary fluid passage 204 and extends system extends over an inlet, such as cooling inlet hole 226, that supplies cooling air for the turbomachine, such as turbine engine 100. In some alternative embodiments, particle separator system 200 is a discrete member that extends over cooling inlet hole 226 only and does not span circumferentially across primary fluid passage 204. Additionally, particle separator system 200 may be made out of sheet metal or any other suitable material. In the exemplary embodiment, particle separator system 200 is made using additive manufacturing. For example, additive manufacturing may be used to generate multiple segments of an array for particle separator system 200, each segment including a cyclone separator 230 such that the array includes multiple cyclone separators. Alternatively, particle separator system 200 may be made using any suitable manufacturing process.

In operation, primary fluid flow 216 and main fluid flow 217 flow through primary fluid passage 204. Main separator body 220 of particle separator system 200 extends over cooling inlet hole 226 which reduces direct particle entry into auxiliary fluid passage 206 from particle-laden primary fluid flow 216 and main fluid flow 217. Particle entry into auxiliary fluid passage 206 is also reduced by fluid properties created by particle separator system 200. In cyclone separator 230, the difference in inertia between particles and air molecules causes primary fluid flow 216 to separate into particle-laden main fluid flow 217 (which is returned to primary fluid passage 204 through main outlet 234) and auxiliary fluid flow 218 (which is diverted into auxiliary fluid passage 206 through auxiliary outlet 236). Main separator body 220 also has a ramp-like shape that optimally accelerates particle-laden primary fluid flow 216 in an axial direction by reducing the cross-sectional area of primary fluid passage 204.

Figure 3:
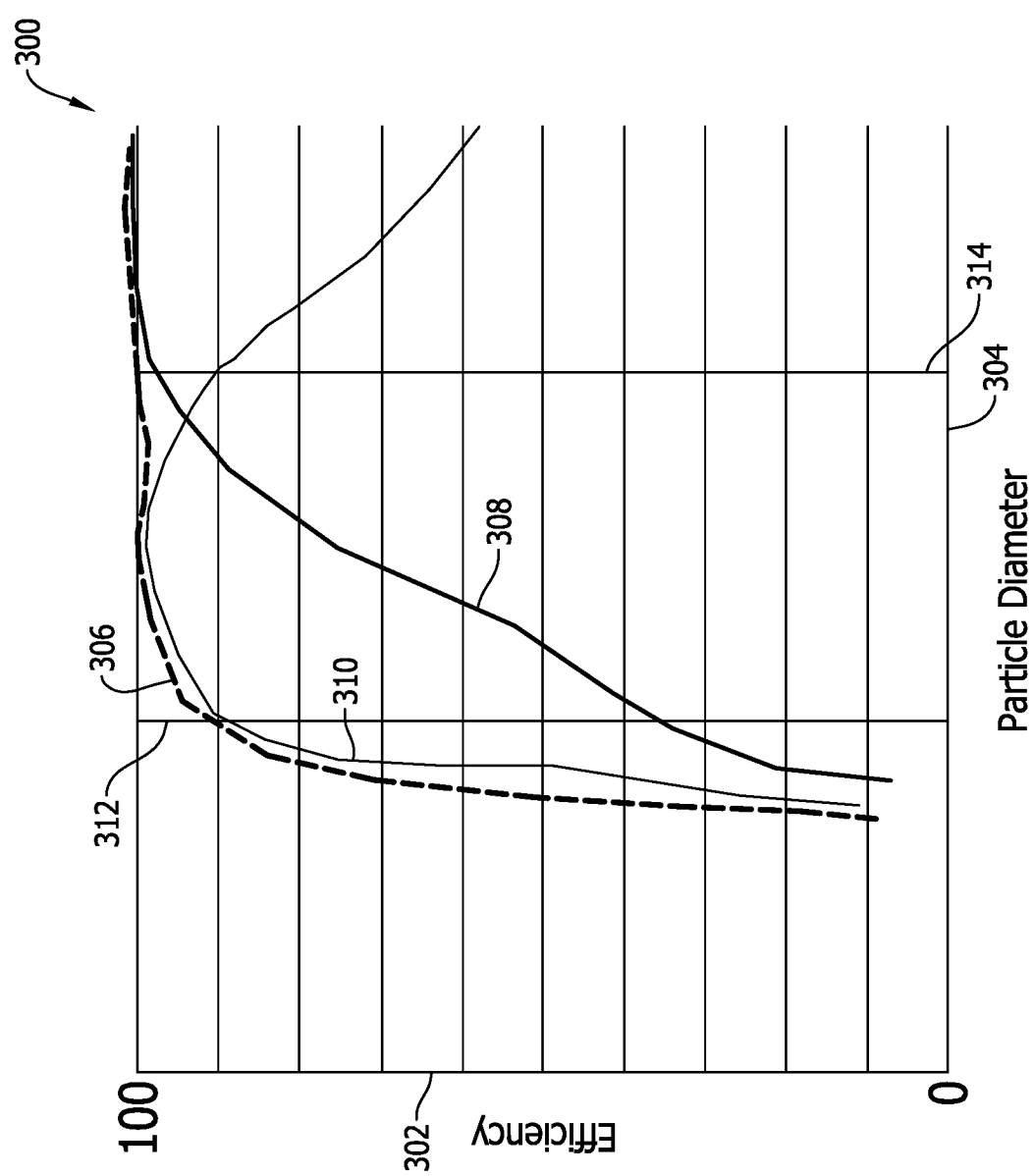
FIG. 3 is a separation graph for the particle separator system shown in FIG. 2.

Specifically, when primary fluid flow 216 is accelerated by cyclone separator 230, the particles have a greater amount of inertia than the air molecules. As primary fluid flow 216 turns several times within cyclone separator 230, dust particles having high inertia are removed through centrifugal force and carried further downstream by main fluid flow 217. Particle entry into auxiliary fluid passage 206 is reduced as shown in FIG. 3, discussed below. In some alternative embodiments, step 228 and cyclone separator 230 are placed in tandem in the direction of primary fluid flow 216. In one embodiment, cyclone separator 230 is configured to generate an auxiliary fluid flow 218 that does not contain particles larger than approximately 1 micron and a main fluid flow 217 that contains particles larger than approximately 1 micron. Additionally, primary fluid flow 216 may contain particles between and including approximately 0.1 microns and 100 microns, and main fluid flow 217 may contain particles between and including approximately 1 micron and 100 microns.

FIG. 3 is a separation graph 300 that includes a y-axis 302 which represents dust reduction for auxiliary fluid passage 206 (shown in FIG. 2). Graph 300 also includes an x-axis 304 which represents particle size. Graph 300 shows three dust reduction curves, or efficiency of particle separation versus particle size curves for auxiliary fluid flow 218 (shown in FIG. 2). The uppermost curve 306 corresponds to auxiliary fluid flow 218 with particle separator system 200 (shown in FIG. 2), including step 228 (shown in FIG. 2) and cyclone separator 230 (shown in FIG. 2) extending over cooling inlet hole 226 (shown in FIG. 2). The lowermost curve 308 corresponds to auxiliary fluid flow 218 without cyclone separator 230, and the middle curve 310 is the curve for auxiliary fluid flow 218 without step 228. The highest efficiency of particle separation is seen with particle separator system 200 including both step 228 and cyclone separator 230. The higher the efficiency of particle separation, the cleaner the cooling air for the air cooled component. Line 312 represents particles having a size of 1 micron, whereas line 314 represents particles having a size of 10 microns.

Figure 4:
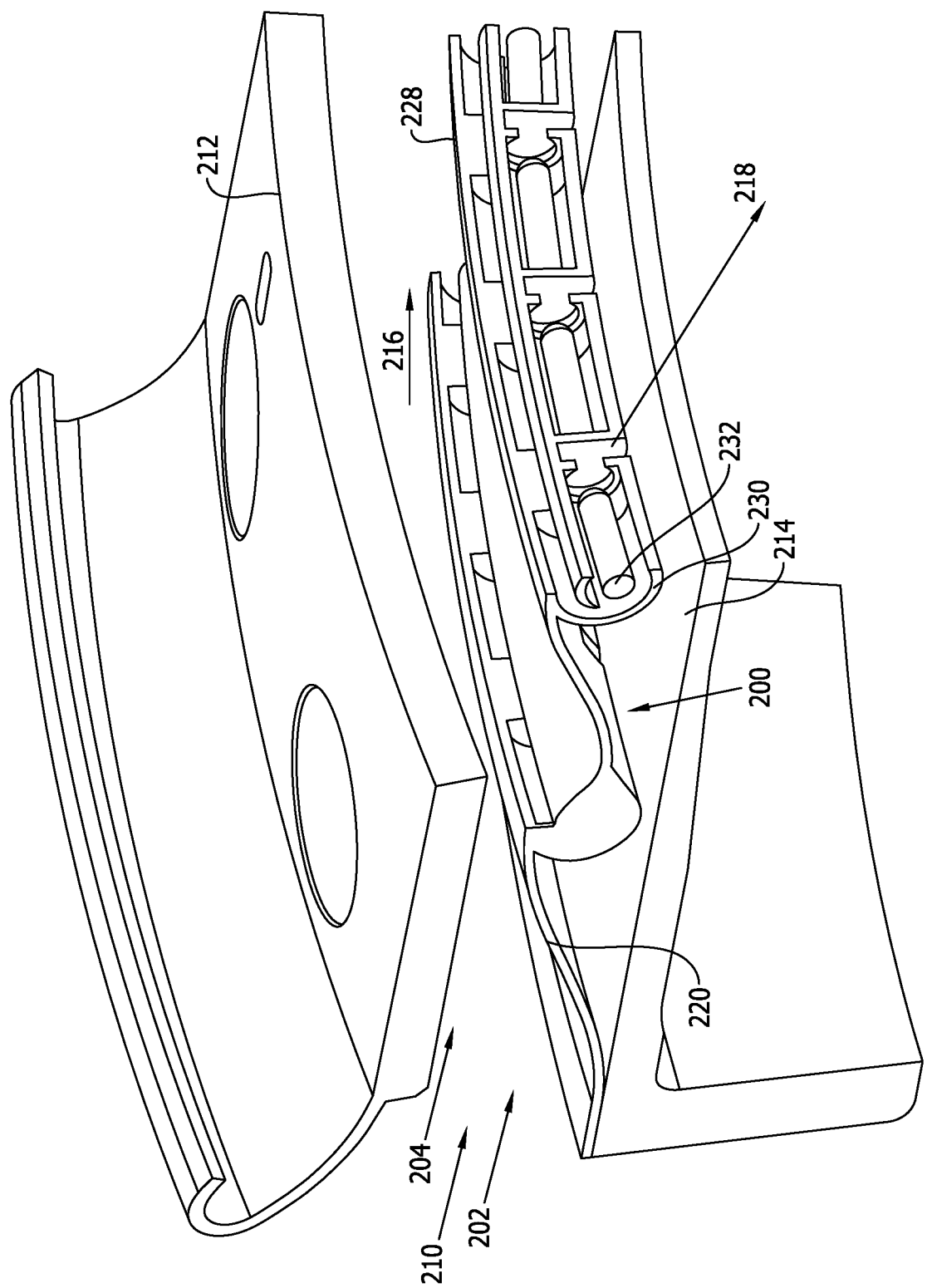
FIG. 4 is an enlarged view of a portion of the cooling system shown in FIG. 2.

FIG. 4 is an enlarged view of a portion of an exemplary cooling system 202 that may be used with turbine engine 100 (shown in FIGS. 1 and 2). As described above, cooling system 202 channels cooling air towards an air cooled component such as blade 125 (shown in FIG. 1). Cooling system 202 includes at least one primary fluid passage 204, such as a combustor bypass passage, coupled in flow communication with at least one auxiliary fluid passage 206 (shown in FIG. 2), such as a cooling air passage. In the exemplary embodiment, primary fluid flow 216 turns approximately 180 degrees at step 228 as it enters particle separator system 200 at inlet 231. Primary fluid flow 216 then enters cyclone separator 230 where it travels transversely through reverse swirling cylinder 232. While traveling through swirling cylinder 232, the centrifugal force generated separates dust particles from air molecules to generate main fluid flow 217 and auxiliary fluid flow 218. Accordingly, as primary fluid flow 216 exits swirling cylinder 232, main fluid flow 217 exits through main outlet 234 into primary fluid passage 204, and auxiliary fluid flow 218 exits through auxiliary outlet 236 towards cooling inlet hole 226 (shown in FIG. 2) and auxiliary fluid passage 206 (shown in FIG. 2).

FIGS. 5A, 5B, and 5C are schematic diagrams of the air flow through particle separator system 200 shown in FIG. 4. In FIG. 5A, combustor bypass flow 210 is channeled within primary fluid passage 204. Primary fluid flow 216 turns approximately 180 degrees at step 228 as it enters main separator body 220 through inlet 231 proximate to face 229. Primary fluid flow 216 enters cyclone separator 230 and swirling cylinder 232 where it centrifugally turns in a direction opposite to the direction of primary fluid flow 216 in primary fluid passage 204. In FIG. 5B, which shows cyclone separator 230 at a different transverse position than FIG. 5A, primary fluid flow 216 continues to swirl in a reverse direction until a separated portion of primary fluid flow 216 exits swirling cylinder 232 and cyclone separator 230 through main outlet 234 as main fluid flow 217. As shown in FIG. 5C, primary fluid flow 216 enters inlet 231 and then enters cyclone separator 230 and travels transversely through reverse swirling cylinder 232. Main fluid flow 217 is generated from a portion of primary fluid flow 216 and cyclone separator 230 is configured to use centrifugal force to generate a substantially particle-free auxiliary fluid flow 218 from primary fluid flow 216. In one embodiment, cyclone separator 230 is configured to generate an auxiliary fluid flow 218 that does not contain particles larger than approximately 1 micron and a main fluid flow 217 that contains particles larger than approximately 1 micron.

FIG. 6 is a perspective cut-away view of an alternative cooling system 602 that may be used with turbine engine 100 (shown in FIGS. 1 and 2). As described above, cooling system 602 channels cooling air towards an air cooled component such as blade 125 (shown in FIG. 1). Cooling system 602 includes at least one primary fluid passage 604, such as a combustor bypass passage, coupled in flow communication with at least one auxiliary fluid passage 206 (shown in FIG. 2), such as a cooling air passage. In the exemplary embodiment, primary fluid flow 616 turns up to 180 degrees at step 628 as it enters particle separator system 600 at inlet 631. Primary fluid flow 616 then enters cyclone separator 630 where it travels transversely through swirling cylinder 632. As compared to swirling cylinder 232 (shown in FIGS. 2 and 4), which is a reverse swirling cylinder, swirling cylinder 632 is a forward swirling cylinder. While traveling through swirling cylinder 632, the centrifugal force generated separates dust particles from air molecules to generate main fluid flow 617 and auxiliary fluid flow 618. Accordingly, as primary fluid flow 616 exits swirling cylinder 632, main fluid flow 617 exits through main outlet 634 into primary fluid passage 604, and an auxiliary fluid flow 618 exits through auxiliary outlet 636 towards cooling inlet hole 226 (shown in FIG. 2) and auxiliary fluid passage 206 (shown in FIG. 2).

FIGS. 7A, 7B, and 7C are schematic diagrams of the air flow through particle separator system 600 shown in FIG. 6. In FIG. 7A, combustor bypass flow 610 is channeled within primary fluid passage 604. Primary fluid flow 616 turns up to 180 degrees at step 628 as it enters main separator body 620 through inlet 631 proximate to face 629. Primary fluid flow 616 enters cyclone separator 630 and swirling cylinder 632 where it centrifugally turns in the direction of primary fluid flow 616 in primary fluid passage 604. In FIG. 7B, which shows cyclone separator 630 at a different transverse position than FIG. 7A, primary fluid flow 216 continues to swirl in a forward direction until a portion of primary fluid flow 616 exits swirling cylinder 632 and cyclone separator 630 through main outlet 634 as main fluid flow 617. As shown in FIG. 7C, primary fluid flow 616 enters inlet 631 then enters cyclone separator 630 and travels transversely through forward swirling cylinder 632. Main fluid flow 617 is generated from a portion of primary fluid flow 616 and cyclone separator 630 is configured to use centrifugal force to generate a substantially particle-free auxiliary fluid flow 618 from primary fluid flow 616. In one embodiment, cyclone separator 630 is configured to generate an auxiliary fluid flow 618 that does not contain particles larger than approximately 1 micron and a main fluid flow 617 that contains particles larger than approximately 1 micron.

FIG. 8 is a flow diagram of a method 800 of enhancing particle removal from a fluid flow in turbine engine 100 (shown in FIG. 1). Method 800 includes establishing 802 a primary fluid flow 216 (shown in FIG. 2) through the at least one primary fluid passage 204 (shown in FIG. 2) of turbine engine 100. Method 800 further includes diverting 804 at least a portion of the primary fluid flow 216 through at least one particle separator system 200 (shown in FIG. 2). Method 800 further includes separating 806, using particle separator system 200, primary fluid flow 216 into a particle-laden main fluid flow 217 (shown in FIG. 2) and a substantially particle-free auxiliary fluid flow 218 (shown in FIG. 2). Additionally, method 800 includes diverting 808 auxiliary fluid flow 218 through the at least one existing or added auxiliary fluid passage 206 (shown in FIG. 2). In the exemplary embodiment, diverting 804 at least a portion of the primary fluid flow 216 through at least one particle separator system 200 includes diverting a portion of primary fluid flow 216 through at least one step 228 (shown in FIG. 2). Diverting 804 at least a portion of the primary fluid flow 216 through at least one particle separator system 200 may also include diverting a portion of primary fluid flow 216 through at least one cyclone separator 230 (shown in FIG. 2). Additionally, separating 806, using particle separator system 200, primary fluid flow 216 into a particle-laden main fluid flow 217 and a substantially particle-free auxiliary fluid flow 218 may include generating a substantially particle-free auxiliary fluid flow, such that the auxiliary fluid flow does not contain particles larger than approximately 1 micron. Additionally, particle separator system 200 may be manufactured as a unitary piece using, for example, additive manufacturing.

The particle separating devices described herein provide a cost-effective method for reducing sand particles and/or particulate matter within cooling systems of turbomachines. Specifically, in order to reduce particles within the cooling system, the particle separators described herein utilize a difference in inertia between particles and air molecules as a separation mechanism. The particle separator is located over a cooling air extraction hole serving as a particle shield such that particles are restricted from directly entering the cooling passage. Optionally, the particle separator further, to increase the difference in inertia, modifies a cross-sectional area of a flow passage, accelerating particle-laden flow therein. Cooling air is routed through a fluid diversion passage within the particle separator. Particle-laden flow turns up to 180 degrees at the step, and is routed through the cyclone separator such that particles with higher inertia are separated and carried downstream.

As such, the amount of particles traveling into the cooling passage is substantially decreased. The particle separators described herein offer advantages that include, without limitation, cost effective implementation and retro fit application. Additionally, the particle separators described herein have a lower weight than many known particle separators, thereby reducing weight penalties in an aircraft engine retrofit. Moreover, use of the particle separators describe herein maintain the effectiveness of cooling systems within turbomachines by reducing particle accumulation and turbulators, which extends engine component service life.

Exemplary embodiments of methods, systems, and apparatus for operating turbomachines are not limited to the specific embodiments described herein, but rather, components of systems and/or steps of the methods may be utilized independently and separately from other components and/or steps described herein. For example, the methods, systems, and apparatus may also be used in combination with other systems requiring reducing particles in a fluid flow, and the associated methods, and are not limited to practice with only the systems and methods as described herein. Rather, the exemplary embodiment can be implemented and utilized in connection with many other applications, equipment, and systems that may benefit from separating particles in a fluid flow.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A particle separator system for use with a turbomachine, said particle separator system comprising:
   a first end upstream in a primary fluid flow;
   a second end opposite and downstream in the primary fluid flow from said first end;
   a main separator body extending between said first end and said second end along the primary fluid flow in a first direction, said main separator body comprising at least one step into the main separator body downstream of said first end and upstream of said second end, the at least one step comprising a downstream-facing, planar face oriented substantially perpendicularly to the first direction, said face defining an inlet within said face configured to receive at least a portion of the primary fluid flow that is caused to turn approximately 180 degrees by the at least one step to enter the inlet in a second direction substantially opposite to the first direction; and
   at least one transversely oriented cyclone separator disposed within said main separator body in fluid communication with the inlet, said at least one transversely oriented cyclone separator defining a swirling cylinder.

2. The particle separator system in accordance with claim 1, wherein said main separator body and said at least one cyclone separator are integrally formed.

3. The particle separator system in accordance with claim 1, wherein said main separator body and said at least one cyclone separator are coupled to one another.

4. The particle separator system in accordance with claim 1, wherein said particle separator system is disposed within a primary fluid passage of the turbomachine.

5. The particle separator system in accordance with claim 1, wherein said main separator body has a ramp-like shape.

6. The particle separator system in accordance with claim 1, wherein said at least one cyclone separator is configured to use centrifugal force to separate the primary fluid flow into a particle-laden main fluid flow and a substantially particle-free auxiliary fluid flow.

7. The particle separator system in accordance with claim 1, wherein said at least one cyclone separator is configured to use centrifugal force to separate the primary fluid flow into a particle-laden main fluid flow and a substantially particle-free auxiliary fluid flow, such that the auxiliary fluid flow does not contain particles larger than approximately 1 micron.

8. The particle separator system in accordance with claim 1, wherein said swirling cylinder is a reverse swirling cylinder.

9. The particle separator system in accordance with claim 1, wherein said particle separator system extends over a coolant inlet that supplies cooling air for the turbomachine.

10. A turbomachine, comprising:
a compressor;
a turbine rotatably coupled to said compressor;
a combustor coupled in flow communication with said compressor and said turbine;
a cooling system comprising a first wall and a second wall at least partially defining at least one primary fluid passage for directing a primary fluid flow therethrough, said first wall further defining at least one auxiliary fluid passage; and
a particle separator system comprising:
 a first end upstream in the primary fluid flow;
 a second end opposite and downstream in the primary fluid flow from said first end;
 a main separator body extending between said first end and said second end along the primary fluid flow in a first direction, said main separator body comprising at least one step into the main separator body downstream of said first end and upstream of said second end, the at least one step comprising a downstream-facing, planar face oriented substantially perpendicularly to the first direction, said face defining an inlet within said face configured to receive at least a portion of the primary fluid flow that is caused to turn approximately 180 degrees by the at least one step to enter the inlet in a second direction substantially opposite to the first direction; and
 at least one transversely oriented cyclone separator disposed within said main separator body in fluid communication with the inlet, said at least one transversely oriented cyclone separator defining a swirling cylinder.

11. The turbomachine in accordance with claim 10, wherein said particle separator system is disposed within said at least one primary fluid passage of said turbomachine.

12. The turbomachine in accordance with claim 10, wherein said swirling cylinder is a reverse swirling cylinder.

13. A method of enhancing particle removal from a fluid flow in a turbomachine, said method comprising:
establishing the fluid flow as a primary fluid flow through at least one primary fluid passage of the turbomachine;
diverting at least a portion of the primary fluid flow through a particle separator system that includes a first end upstream in the primary fluid flow, a second end opposite and downstream in the primary fluid flow from the first end, and a main separator body extending between the first end and the second end along the primary fluid flow in a first direction, the main separator body including at least one step into the main separator body downstream of the first end and upstream of the second end, the at least one step including a downstream-facing, planar face oriented substantially perpendicularly to the first direction, the face defining an inlet within the face configured to receive at least the portion of the primary fluid flow which is caused to turn approximately 180 degrees by the at least one step to enter the inlet in a second direction substantially opposite to the first direction, the particle separator system further including at least one transversely oriented cyclone separator disposed within the main separator body in fluid communication with the inlet, the at least one transversely oriented cyclone separator defining a swirling cylinder;
separating, using the particle separator system, the primary fluid flow into a particle-laden main fluid flow and a substantially particle-free auxiliary fluid flow; and
diverting the auxiliary fluid flow through at least one existing or added auxiliary fluid passage.

14. The method of claim 13, wherein the substantially particle-free auxiliary fluid flow does not contain particles larger than approximately 1 micron.

15. The method of claim 13, wherein the particle separator system is manufactured using additive manufacturing.

16. The method of claim 13, wherein the particle separator system includes an array having a plurality of the transversely oriented cyclone separators, the array manufactured using additive manufacturing.

* * * * *